Dec. 27, 1966  J. ERANOSIAN  3,294,376
AIR-SCOOP ACTUATED AIR CONDITIONER
Filed June 14, 1965
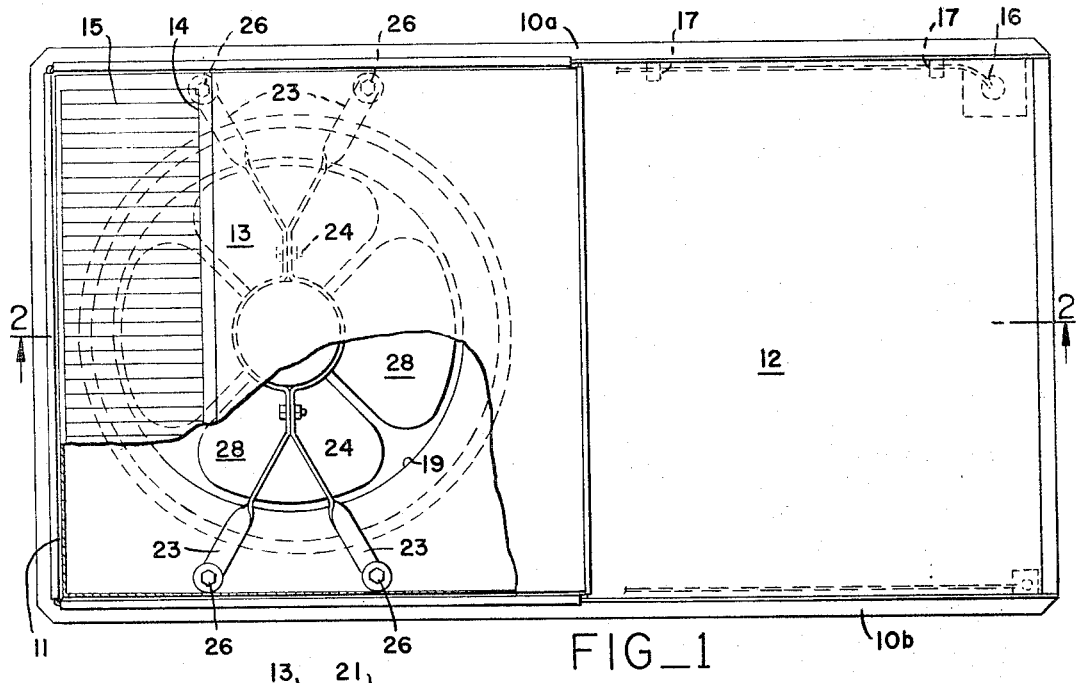
FIG_1
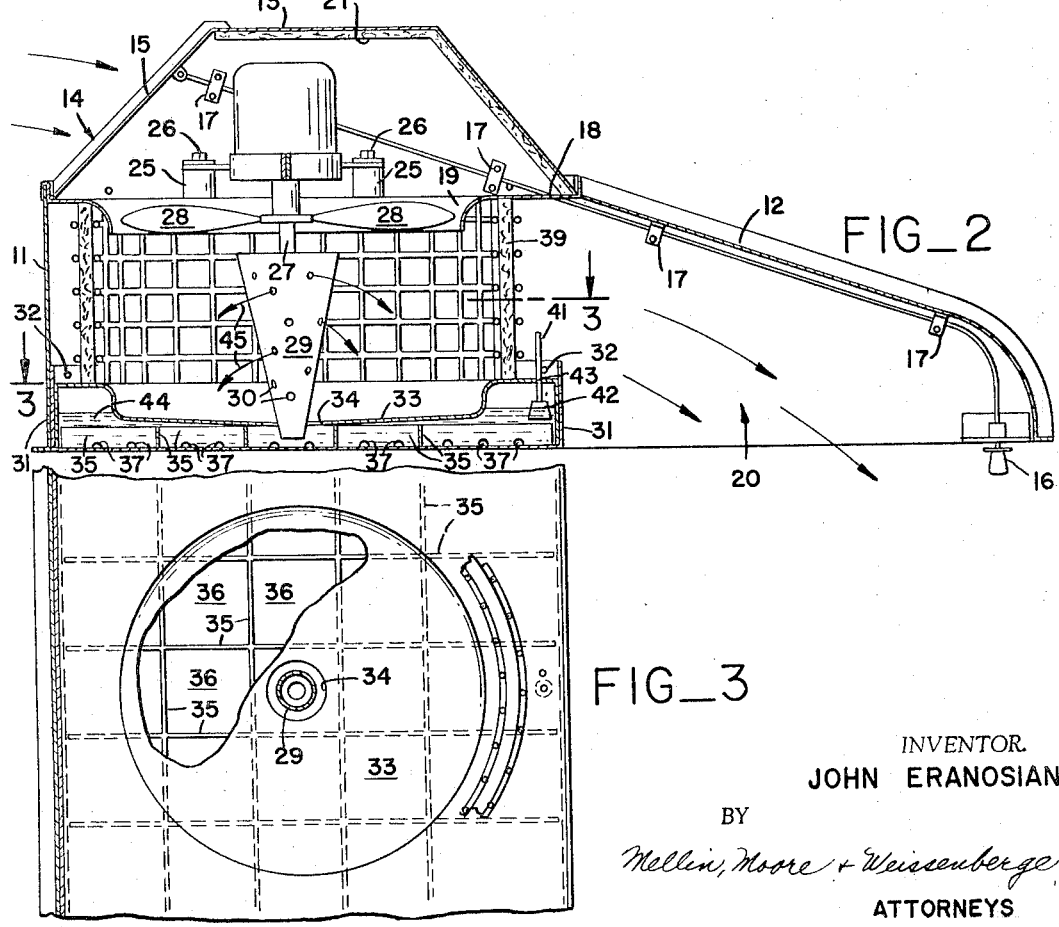
FIG_2
FIG_3
INVENTOR.
JOHN ERANOSIAN
BY
Mellin, Moore + Weissenberger
ATTORNEYS United States Patent Office 3,294,376
Patented Dec. 27, 1966

3,294,376
AIR-SCOOP ACTUATED AIR CONDITIONER
John Eranosian, 175 Phillip Road,
Woodside, Calif. 94061
Filed June 14, 1965, Ser. No. 463,614
5 Claims. (Cl. 261—29)

This invention relates to an air-scoop actuated air conditioner for particular use in cooling a house trailer, camping trailer, or any other mobile enclosed volume. It is an improvement over the invention described in United States Patent 2,771,283 entitled Air Conditioning Unit, filed May 5, 1955, and issued November 20, 1956.

Many camping trailers, house trailers, and other enclosed carriers are operated in a warm environment. It is therefore desirable to provide some means for controlling the temperature inside the trailer when in such an environment to make it more satisfactory for habitation. The invention referred to above (United States Patent No. 2,771,283) provides apparatus for conditioning the air in a trailer or other enclosed volume but does not include all the advantages of the present invention.

In particular, my prior invention is designed for operation only when stationary. Operation is not feasible during movement (when the camping trailer is being transported from one location to another) because acceleration and deceleration cause the refrigerant to spill. Moreover, the unit of the prior art is operable only when provided with electrical energy or some other stored energy to cause rotation of the frusto-conical pump.

Accordingly, it is an object of the present invention to provide an air conditioning unit operable under conditions of acceleration and deceleration.

It is a further object of the present invention to provide an air conditioning unit that is actuated by energy derived from the velocity of the unit.

It is another object to provide an air conditioning unit that is actuated by means of an air scoop.

It is another object to provide an air conditioning unit that may be actuated by both the kinetic energy of the unit, in the case where the unit has a velocity, and electrical energy, in the case where the unit is stationary.

Each of the above objects is fulfilled by the specific embodiment which appears in FIGS. 1, 2 and 3.

FIG. 1 is a top view of the air conditioning unit with a portion cut away to show the fan, the motor, and its mounting.

FIG. 2 is a sectional view taken on the line 2—2 of FIG. 1.

FIG. 3 is a sectional view taken on the line 3—3 of FIG. 2.

With reference to FIGS. 1 and 2, the invention includes a housing consisting of two sides 10a and 10b, an end 11, a hood 12, and an air scoop 13. Air scoop 13 is provided with an opening 14 which is covered by louvres 15. Louvres 15 may be opened and closed by means of louvre control 16 which is disposed along side 10a and secured thereto by brackets 17.

A funnel-shaped baffle 18 is mounted to the top of sides 10a and 10b, end 11, and hood 12 to define an inlet 19. Hood 12 is bottomless to thereby define an outlet 20. A path through the air conditioning unit is, therefore, defined and consists of entry through opening 14, passage through inlet 19, and exit through outlet 20.

If desired, a suitable damping material 21 may be provided beneath air scoop 13 to minimize the noise created by the passage of air through the air scoop.

A 12 volt D.C. two-speed motor 22 is mounted in air scoop 13 above inlet 19 on motor mounts 23. Motor mounts 23 are clamped to motor 22 by means of connectors 24 and are secured to funnel-shaped baffle 18 on rubber mounts 25 by means of connectors 26. Motor 22 is disposed so that its shaft 27 extends downwardly and is concentric with inlet 19.

A four-bladed fan 28 is keyed to shaft 27 and is disposed within inlet 19.

A foraminous frusto-conical pump 29 is also keyed to shaft 27 and is disposed below inlet 19. Pump 29 is shown more particularly in United States Patent No. 2,771,283 and therefore a detailed description is not necessary here. In general, however, it consists of a hollow frustrum of a cone and includes a series of openings 30 and in that sense is foraminous.

A water pan 31 is secured to sides 10a and 10b by connectors 32 and is disposed beneath inlet 19. It contains a baffle 33 which defines an aperture 34 disposed concentrically with shaft 27. A series of partition members 35 is disposed between baffle 33 and the bottom of water pan 31 and define a series of compartments 36, as shown in FIG. 3. The partition members 35 also define a series of gates 37 with the bottom of water pan 31. Baffle 33 is sloped toward aperture 34 as best seen in FIG. 2. Water pan 31 and baffle 33 are positioned so that the smaller end of pump 29 extends through aperture 34 and into water pan 31.

A Fiberglas filter 38 is cylindrically formed and seated in cage 39. Cage 39 is secured to baffle 33 and extends from baffle 33 to funnel-shaped baffle 18. Filter 38 disposed therein therefore extends from inlet 19 to baffle 33.

A water-level gauge 40 consisting of a graduated rod 41 and cork float 42 is vertically reciprocal in gauge aperture 43 of baffle 33. Thus, the position of rod 41 varies with the level of water 44 in water pan 31 and is observable through outlet 20.

Water serves as a suitable refrigerant and, because of its availability, is the preferred refrigerant. Other refrigerants, however, may be used in association with the apparatus disclosed without departing from the scope of the invention.

The invention described is operable, when stationary, by electrical energy supplied to motor 22 and, when moving, by the kinetic energy of air forced into opening 14 through louvres 15, over fan 28, through inlet 19, through filter 38, and out outlet 20.

For air-scoop actuation it is apparent that opening 14 must be positioned in the direction of movement. When so disposed, in the roof of a camping trailer, for example, air forced into opening 14 acts upon fan 28 to cause rotation of shaft 27 and consequently rotation of pump 29. Water 44 from water pan 31 is centrifugally lifted in pump 29 and expelled in the form of a spray through openings 30. As shown by arrows 45, the incoming air passes through the zone of the spray and is cooled. The cool air then passes through filter 38, out inlet 20 and into the confines of the trailer or other enclosed volume.

During acceleration and deceleration, refrigerant 44 is prevented from splashing out of water pan 31 by baffle 33. Partition members 35 dampen the movement of the refrigerant in water pan 31 yet allow refrigerant to pass into adjacent compartments at a restricted rate through gates 36.

For stationary operation, motor 22 is electrically actuated and fan 28 as well as pump 29 are rotated by shaft 27. When so rotated fan 28 causes air to circulate in the direction of arrow 45 and pump 29 operates as described above.

It may be seen therefore that the above invention provides an air conditioning unit, the refrigerant of which is not significantly affected by acceleration or deceleration. Moreover, the unit is capable of being actuated by both electrical energy supplied by motor 22 and, when the air conditioning unit has velocity, the force of air entering air scoop 13 through opening 14 upon fan 28.

Having thus described my invention, I claim:

1. An air-scoop actuated air conditioner which comprises a housing having an inlet and an outlet disposed below said inlet; an air scoop communicating with said inlet; a fan disposed concentrically within said inlet on a rotatable shaft; means for rotating said shaft; a pan disposed within said housing below said fan; a baffle covering said pan, having a central aperture therein, and a surface sloping downwardly to said aperture; a foraminous frusto-conical pump secured concentrically to said shaft below said fan and extending through said aperture; and a filter element surrounding said pump, spaced therefrom and extending from said inlet to said baffle.

2. The air conditioner of claim 1 and a series of vertical partitions disposed in said pan below said baffle.

3. The air conditioner of claim 1 and a series of louvres disposed across the opening of said air scoop and means for opening and closing said louvres.

4. An air-scoop actuated air conditioner which comprises a housing having an inlet and an outlet disposed below said inlet; an air scoop having an opening therein communicating with said inlet; a series of louvres disposed across said opening; means for opening and closing said louvres; a fan disposed concentrically within said inlet on a rotatable shaft; a motor mounted within said air scoop for rotating said shaft; a pan disposed within said housing below said fan; a baffle covering said pan, having a central aperture therein and a surface sloping downwardly to said aperture; a series of vertical partitions disposed in said pan below said baffle, said partition defining a series of gates with the bottom of said pan; a foraminous frusto-conical pump secured concentrically to said shaft below said fan and extending through said aperture; and a filter element surrounding said pump, spaced therefrom and extending from said inlet to said baffle.

5. The air conditioner of claim 4 and water in said pan in contact with said pump.

References Cited by the Examiner
UNITED STATES PATENTS

| | | |
|---|---|---|
| 2,364,249 | 12/1944 | Steele. |
| 2,752,134 | 6/1956 | Paulus. |
| 2,771,283 | 11/1956 | Eranosian. |
| 2,998,714 | 9/1961 | Bonzer. |

HARRY B. THORNTON, *Primary Examiner.*

T. R. MILES, *Assistant Examiner.*